UNITED STATES PATENT OFFICE.

HENRY A. ROBINSON, OF FOXCROFT, MAINE.

METALLIZED-RUBBER COMPOUND.

SPECIFICATION forming part of Letters Patent No. 284,760, dated September 11, 1883.

Application filed April 16, 1883. (Specimens.)

*To all whom it may concern:*

Be it known that I, HENRY A. ROBINSON, of Foxcroft, in the county of Piscataquis and State of Maine, have invented a new and useful Metallized-Rubber Compound or Rubberized-Metal Compound, of which the following is a full, clear, and exact description of the manner of making and using the same.

The object of my invention is to metallize rubber in a high degree and produce it in sheets ready for application to vulcanizable rubber or other vulcanizable gums, and to other substances, as will more fully appear.

My invention consists in taking finely-divided metal, metallic felt, or metal made porous or spongy by any suitable means, and unite the finely-divided strands, or fill the pores of the metal with vulcanizable rubber or analogous gums in solution, so as to make a homogeneous mass of metal with a sufficient amount of rubber in to cause the particles of metal to adhere together, and to vulcanizable rubber or other substances when subjected to the proper degree of heat.

In carrying out my invention I take very fine shavings or fibers of metal and unite or mix them thoroughly with a solution of vulcanizable rubber, gutta-percha, or allied gum or gums. I prefer, however, to use india-rubber. The rubber solution may be made by any of the well-known solvents of rubber, preferably chloroform. The proportion of metal and rubber which I prefer to use is about ten parts, by weight, of metal to one part of rubber. These proportions may, however, be changed within certain limits without departing from the spirit of my invention, it being desirable to use only enough rubber to cause the fibers of the metal to adhere together or to fill the pores of the felt or spongy metal, so as to effect the adhesion of the foil or sheets thus made to vulcanizable rubber or other gums or substances under the influence of heat. After mixing the mass is formed in thin sheets of uniform thickness and the volatile solvent of the rubber allowed to evaporate, either from natural or artificial causes, after which it is rolled into thin sheets of uniform thickness of about the one-hundredth part of an inch, although I do not wish to confine myself to the dimensions above stated. Instead of mixing the loose fibers or threads of metal in mass with the rubber solution, the softer metals may be taken in the form of metal felt and saturated with the rubber solution, and afterward allowing the solvent to evaporate, which, as in the former case, leaves the material in a compact, smooth, tough, yet quite soft and flexible condition, completely changed in form, qualities, and appearance from the felt before it was saturated with the rubber solution; and after the volatile solvents have been partially or wholly evaporated the sheets may be rolled and compacted together in any suitable manner.

In case it is desirable to use the harder and more unyielding metals—as gold, for instance—the sheet should be prepared in the following manner: Take an article or preparation called "crystal" or "sponge" gold, which is gold deposited by electrolysis in the form of very fine soft sponge, and cut into thin uniform slices from the block or mass and saturate them with the rubber solution, evaporate the volatile solvents of the rubber, and roll or press into sheets, as before mentioned.

Other forms of metal may be used, such as metal sheets having one surface plain and compact and the other surface spongy or reticular or saculated. The rubber solution is applied to the last-mentioned surface, the volatile solvents evaporated, and the sheets rolled or compacted, as before stated.

The material which I produce by any of the above modes of manipulation is in appearance more like metal than rubber, yet to the touch is more like rubber than metal. It possesses a considerable degree of toughness, is pliable and soft, owing largely to the finely-divided yet fiber-like state of the metal incorporated in it, the best form perhaps being that of very fine hair-like fibers. This gives the resulting product peculiar properties. The fibers are so interlaced that with the small amount of rubber necessary to cement them together it is pliable, flexible, and tenacious enough to be molded in sheet form in connection with the ordinary sheet-rubber used to form dental plates, while it is soft enough to mold itself under light pressure into all the inequalities of the dental or other mold, contains rubber enough in its surface and body to vulcanize solidly with and be cemented to the rest of the plate, while the metal so largely predominates that there is practically a solid metallic surface imparted to the article.

My improved metallized rubber or rubberized metal is specially adapted for the lining or facing of dental plates, but may be used for a variety of purposes—for the ornamenting of metal or rubber, &c.; but when used as a lining or facing for vulcanite the sheets prepared as above described are placed upon and held by pressure in contact with the article and vulcanized therewith.

I am aware that it is not new to mix metal dust and filings with a rubber solution, and that it has been proposed to incorporate sheets and strips of metal with rubber by kneading and mixing without the aid of solvents, so that a mere mixture of metal and rubber is not new with me.

Having thus described my invention, what I claim, and desire to secure by Letters Patent, is—

1. A compound consisting of ten parts of finely-divided metal and one part of vulcanizable gum, rendered plastic or semi-liquid by a suitable solvent, as set forth.

2. As a new article of manufacture, a sheet of rubberized metal, composed of metallic fibers, metal felt, or metal sponge the particles of which are joined or the pores of which are filled with vulcanizable rubber or other analogous gum, as set forth.

3. As a new article of manufacture, a sheet of rubberized metal, composed of a mat or bat of finely-divided strands of metal cemented together with a vulcanizable gum, and having the appearance of the metal of which it is composed, as set forth.

4. A sheet or facing of rubberized metal adapted to be applied to articles by means of the vulcanizable material contained in said sheet or facing.

HENRY A. ROBINSON.

Witnesses:
MARCELL W. HALL,
LISTON P. EVANS.